United States Patent [19]

Blau

[11] Patent Number: 4,574,502

[45] Date of Patent: Mar. 11, 1986

[54] TRANSPARENT PLOW BLADE

[76] Inventor: James R. Blau, 13220 W. Burlawn Ct., Brookfield, Wis. 53003

[21] Appl. No.: 773,600

[22] Filed: Sep. 9, 1985

Related U.S. Application Data

[63] Continuation of Ser. No. 660,111, Oct. 12, 1984, abandoned.

[51] Int. Cl.[4] .............................................. E01H 5/06
[52] U.S. Cl. ........................................ 37/266; 172/747
[58] Field of Search ................ 37/266, 279, 281, 270, 37/284; 294/54.5, 55; 172/747, 811, 817

[56] References Cited

U.S. PATENT DOCUMENTS

| 1,698,809 | 1/1929 | Angell | 37/279 |
| 3,274,684 | 9/1966 | Marks | 37/266 |
| 3,432,947 | 3/1969 | Peitz | 37/281 |
| 3,466,766 | 9/1969 | Kahlbacher | 37/270 |
| 4,187,624 | 2/1980 | Blau | 37/266 |
| 4,275,514 | 6/1981 | Maura | 37/281 |
| 4,385,458 | 5/1983 | Pitti | 37/281 |

OTHER PUBLICATIONS

Modern Plastics Encyclopedia, Oct. 1977, vol. 54, No. 10A, pp. 2-3, 82-83.

Primary Examiner—E. H. Eickholt

[57] ABSTRACT

A plow blade for snow plowing or other plowing applications is constructed prepared from a transparent material to reduce plow weight and to permit the normal lighting of the plow vehicle to be seen through the plow blade, thus eliminating the need for auxiliary lighting. The plow blade is especially suitable for use with small plows, such as those designed for use with small four-wheel drive passenger cars. In the preferred embodiment, a transparent, replaceable plastic plow face member is supported by a light weight frame.

8 Claims, 4 Drawing Figures

U.S. Patent    Mar. 11, 1986    4,574,502
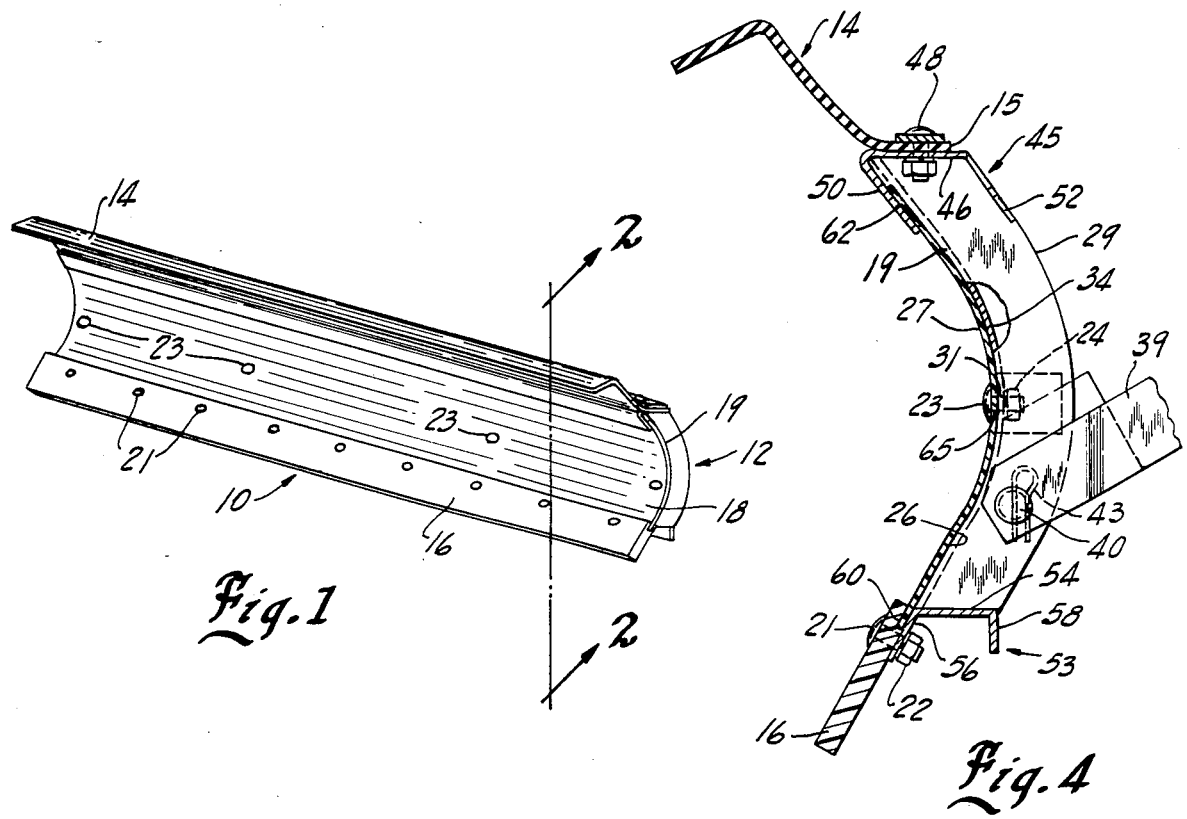
Fig.1
Fig.4
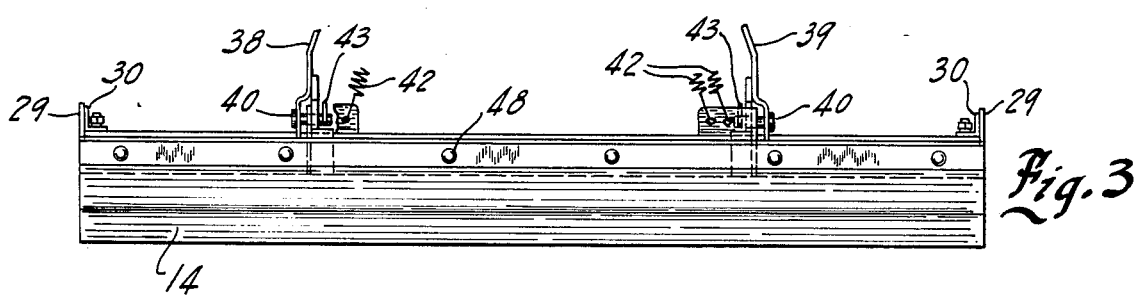
Fig.3
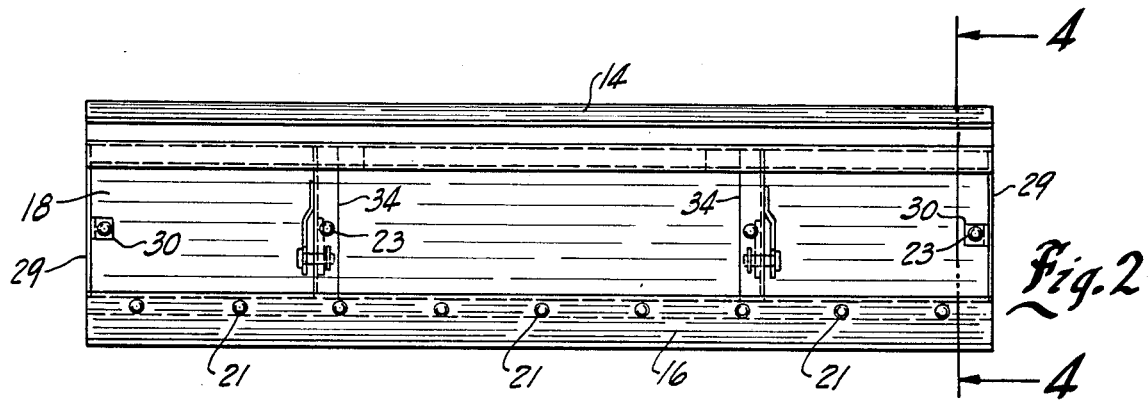
Fig.2

4,574,502

TRANSPARENT PLOW BLADE

CROSS-REFERENCE TO RELATED APPLICATIONS

This is a continuation of application Ser. No. 660,111, filed Oct. 12, 1984 now abandoned.

BACKGROUND OF THE INVENTION

1. Field of the Invention

The present invention relates generally to the art of plow blades for snow removal or other applications, and more particularly to a transparent, light weight plow blade which is especially useful with small vehicles, such as four-wheel drive passenger vehicles.

2. Description of the Prior Art

Plows of many different sizes and applications are known to the art. For example, there are municipal snow plows for highway snow clearing; truck mounted plows for smaller jobs such as the clearing of parking lots; and, there are passenger vehicle mounted plows for yet smaller jobs. An example of the latter is described in U.S. Pat. No. 4,187,624 issued to the present inventor on Feb. 12, 1980 for "Snow Plow".

The plow described in the above-mentioned patent includes a plow blade, a frame which is mounted to a vehicle, such as a passenger car, and a coupling device for those two components. The coupling component includes a pair of generally horizontal cylinders to adjust the angular orientation of the blade with respect to the longitudinal axis of the vehicle and a third cylinder coupled to a bell crank assembly for elevating or lowering the blade with respect to the surface to be plowed.

While the snow plow described in my earlier patent has achieved commercial success, it suffers from certain disadvantages when it is used with certain vehicles. Such disadvantages are shared by a number of other plows, especially those competitive plows designed for use with small cars and trucks.

The disadvantages relate primarily to weight and to the operation of the plows at night. With regard to the weight problem, most prior art plows are quite heavy when combining the frame, plow blade and coupling assembly. Naturally, the heavier the plow blade, the heavier the coupling assembly and frame must be. Increased weight decreases fuel consumption for the vehicle, causes modification of the suspension characteristics of the vehicle, makes installation more difficult, etc.

With regard to the other above-mentioned drawback of existing plows, all known plow blades are solid metal, and special lighting must be employed for nighttime plowing or any other plowing application where it is necessary to be able to see the vehicle headlights and/or turn signals. With large trucks, where the headlight level is quite high, these considerations may not be a problem. However, the problem becomes very important where the plow is used with smaller passenger cars or trucks. In these applications, the plow blade's upper edge may be above the level of the headlights, even when the blade is in its lowered or operating position. Headlight obstruction almost always occurs when the blade is in its elevated or travelling position. In addition to blocking the headlights, the plow blade also blocks the parking lights and turn signal indicators of most small vehicles.

The prior art solution for the latter problems have been to provide auxiliary lighting for the vehicle, such as lighting affixed to the hood or roof. Such auxiliary lighting, of course, adds to the expense of a plow system and further increases the system weight. Moreover, the use of auxiliary lighting increases the installation time, a particularly troublesome problem if the plow is only attached to the vehicle frame for occasional use.

While the prior art has been described only by reference to snow plowing applications, the problems described also exist in other types of plowing applications, such as garden plowing and earth leveling. In fact, some plows, known as multi-purpose plows, are suitable for summer jobs as well as for snow removal. In any event, a plow blade which overcomes the aforementioned difficulties would represent a significant advance in the art.

OBJECTS AND SUMMARY OF THE INVENTION

It is a primary object of the present invention to provide a plow blade which overcomes the aforementioned disadvantages of the prior art.

Another object of the present invention is to provide a light weight plow blade.

A further object of the present invention is to provide a transparent plow blade to allow standard equipment vehicle lighting to be employed.

A still further object of the present invention is to provide a plow blade which has a replaceable, transparent insert.

How these and other objects of the present invention are accomplished will be described by reference to the drawings, taken in conjunction with the detailed description of the preferred embodiment. Generally, however, the objects are accomplished by providing a plow blade having a structural frame to be attached to the plow coupling apparatus. A generally concave, elongate transparent member, prepared from a material such as plastic, is removable coupled to the frame. A top deflector may be employed with the plow and a bottom wear plate can be affixed to the bottom of the frame. The blade of the present invention can be used as a replacement for existing blades of conventional plow equipment, or it can be used as part of a new light weight plow system having lighter frame and coupling components.

DESCRIPTION OF THE DRAWINGS

FIG. 1 is a perspective view of a plow blade according to the preferred embodiment of the present invention;

FIG. 2 is a front elevation of the plow blade of FIG. 1 taken along the line 2—2 of FIG. 1;

FIG. 3 is a top plan view of the plow blade of FIG. 1; and

FIG. 4 is a sectional view of the plow blade of the present invention, taken along the line 4—4 of FIG. 2.

DESCRIPTION OF THE PREFERRED EMBODIMENT

A plow blade 10 according to the present invention is shown generally in FIG. 1 to include four main components: a structural frame 12, a top deflector 14, a wear plate 16 and a plow face member 18. Before proceeding to a detailed description of these components, it should be indicated here that the size and shape of blade 10 may be varied over a wide range. For example, the plow could be shorter and taller, or longer and thinner, depending on end use application. Moreover, the deflector 14 and wear plate 16 are, in and of themselves, known to the art and individually form no part of the invention. The particular thickness, configurations and materials employed therefor can be widely varied.

Frame 12, in the illustrated embodiment of FIG. 1, comprises a metal framework defining a forwardly presented concave surface 19 for receiving face member 18. The frame will be described in greater detail hereafter. Deflector 14 is composed of an elongate, generally Z-shaped member having a length equal to that of plow 10. The base 15 of deflector 14 is bolted to the top of the frame in such a way that the middle and top portions thereof extend forwardly and upwardly from the top of the frame. Deflector 14 is provided to prevent snow (or dirt if the plow is being used for summer work) from flowing over the top of plow 10. Deflector 14 is conventionally made of rubber or a flexible resin material.

Wear plate 16 is an elongate, generally rectangular plate having a length equal to plow 10. It is secured to the frame 12 with bolts 21 and nuts 22. In the preferred embodiment, the plate is made of an abrasion resistant resin, but it could also be made of metal if desired. Plate 16 contacts the surface to be plowed and is subject to a high degree of wear. This component may be replaced simply by removing the bolts 21, and substituting a new plate 16 as often as required.

The plow face member 18 shown in FIG. 1 is a relatively thin curved, elongate piece of plastic material coupled to the structural frame 12 using bolts 23 and nuts 24. As is apparent from this FIGURE and the other drawings, in the preferred embodiment the face 18 is also transparent. Face member 18 has a rear convex surface 26 conforming to the forwardly presented concave surface of the structural frame 12 and a forwardly presented concave surface 27. Materials, such as Plexiglass, or other clear resin materials may be used. Because face member 18 does encounter rocks, pieces of ice and the like during use, the material selected for its construction should be as tough as possible and it should be resistant to cuts, scrapes and other forms of abrasion. Preferably, face member 18 has a limited amount of flexibility, as well as the required toughness, to permit easy installation as will soon be described.

FIG. 2 is a front elevation of the plow 10 and illustrates the transparent nature of the face member 18. This drawing also shows that structural frame 12 includes a pair of arcuate end plates 29, each of which has a bracket 30 attached at the center thereof and extending toward the center of plow 10. Brackets 30 each contain a hole 31 for recuring bolts 23. Another pair of arcuate support plates 34 are provided at central, but spaced apart, locations on the structural frame 12. These plates also include similar brackets 30 for receiving bolts 23.

From FIG. 3, it can be seen that plow blade 10 may be coupled to a coupling assembly (not shown in detail) using coupling arms 38 and 39. Arms 38 and 39 are pivotably coupled to the central support plates 34 using pins 40 and securing members 43. As has previously been mentioned, the blade 10 can be used with a wide variety of coupling apparatus so only a schematic illustration is provided here. It can also be seen in FIG. 3 that springs 42 are coupled to the back of blade 10. The other end of springs 42 (not shown) are coupled to the coupling assembly for the well known purpose of allowing the plow blade 10 to tilt if an obstruction is encountered during plowing. The bottom of the blade is thereby allowed to move rearwardly and the top of the blade is allowed to move forwardly from its normal position against the spring tension of springs 42. Once the obstruction is passed, the springs 42 draw the blade back to its normal position.

Proceeding now to FIG. 4, it can be seen that the structural frame 12 includes a top frame member 45 coupled to the four support plates 29 and 34. Member 45 includes a generally horizontal top surface 46 (which receives the bolts 48 to hold the deflector 14 in place). Member 45 also includes a downwardly and rearwardly extending front flange 50 and a rearwardly and downwardly extending rear flange 52. The arcuate plates 29 and 34 are secured thereto by any suitable means, such as by welding.

A bottom frame member 53 extends along the bottom of frame 12 and is also generally U-shaped. It also includes an upper horizontal surface 54, a front, downwardly extending flange 56 (to which wear plate 16 is attached) and a rear downwardly extending flange 58. Plates 29 and 34 are secured to this member, again by any suitable means, such as welding.

As also noted in FIG. 4, the plates 29 and 34 are secured to members 45 and 52 in such a way that a bottom slot 60 is provided between flange 56 and the deflector plate 14 and so that an upper slot 62 is provided between flange 50 and the four plates 29 and 34. Face member 18 is slidably received between slots 60 and 62 so that holes 65 in the face member 18 align with the holes 31 in brackets 30 so that bolts 23 can be inserted therethrough.

Plow 10 operates in the same manner as the plow described in my earlier patent identified above, but because the face member 18 is much lighter than the metal blade of my prior device, the overall weight of the plow is substantially reduced. Moreover, because the blade is lighter, the coupling system designed for my new plow blade is also lighter, and in turn, the frame coupled to the car or other drive vehicle is also lighter.

In use, I have found that the transparent nature of the blade allows me to employ the normal headlights, turn signals and parking lights of a car or truck, without using auxiliary lighting. Moreover, such conventional lighting is readily visible to oncoming traffic with my transparent plow blade so that the vehicle can be safely operated. My new plow blade allows for a complete passenger car plow system to be built weighing less than 200 pounds, thereby greatly facilitating installation by one person and the quick attachment and removal of the plow when it is only occasionally attached to the drive vehicle.

While the present invention has been described with reference to only a single preferred embodiment, it is not to be limited thereby, but is to be limited solely by the claims which follow.

I claim:

1. In combination, a motor vehicle having a plow attached to the front end thereof and being capable of being placed in a plowing or a non-plowing transport position, said plow comprising a framework presenting a forwardly extending configuration suitable for plowing and a plow face member attached to said framework, said plow face member being transparent to visible light over substantially all of its surface to thereby permit passage of vehicle lighting therethrough when said plow is in its plowing or non-plowing transport position.

2. The blade set forth in claim 1 wherein said configuration is an elongate generally concave configuration.

3. The blade set forth in claim 1 wherein said face member is constructed of plastic.

4. The invention set forth in claim 1 wherein said plow also includes a deflector means along the top edge thereof.

5. The invention set forth in claim 1 wherein said plow blade further includes an elongate, replaceable, wear plate means along its lower edge.

6. The invention set forth in claim 1 wherein said framework include slot means for slidably receiving said face member.

7. The invention set forth in claim 6 wherein said face member is attached to said framework by bolt means.

8. In combination, a motor vehicle having a snow plow attached to the front end thereof and being capable of being placed in a plowing or a non-plowing transport position, said snow plow comprising a metal framework including elongate top and bottom edges and a plurality of spaced-apart support members connecting said top and bottom edges, said support members having a forwardly directed surface which is generally concave in configuration, said support members including plate means adjacent the center thereof, said plate means being coplanar and adjacent to said surface, a plastic plow face member being transparent to visible light over substantially all of its surface coupled to said framework by connecting means passing through said face member and said plate means, to thereby permit the passage of vehicle lighting through said face member when said plow is in its plowing or its non-plowing transport position.

* * * * *